(12) United States Patent
Klettke

(10) Patent No.: US 11,111,015 B2
(45) Date of Patent: Sep. 7, 2021

(54) DRONE WITH TARGET TRACKING AND SIGNAL OUTPUT

(71) Applicant: AIRBUS DEFENCE AND SPACE GMBH, Taufkirchen (DE)

(72) Inventor: Marcus Klettke, Bremen (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 622 days.

(21) Appl. No.: 15/914,911

(22) Filed: Mar. 7, 2018

(65) Prior Publication Data
US 2018/0273175 A1  Sep. 27, 2018

(30) Foreign Application Priority Data
Mar. 24, 2017  (DE) .......................... 202017101730.3

(51) Int. Cl.
*B64C 39/02* (2006.01)
*G08G 1/0955* (2006.01)
(Continued)

(52) U.S. Cl.
CPC .............. *B64C 39/024* (2013.01); *B60Q 7/00* (2013.01); *B64D 47/02* (2013.01); *G05D 1/0011* (2013.01);
(Continued)

(58) Field of Classification Search
CPC ... B60Q 7/00; B64C 2201/00; B64C 2201/02; B64C 2201/027; B64C 2201/12; B64C 2201/122; B64C 2201/126; B64C 2201/14; B64C 2201/141; B64C 2201/146; B64C 2201/20; B64C 2201/208; B64C 39/00; B64C 39/02; B64C 39/024; B64D 47/00; B64D 47/02; G05D 1/00; G05D 1/0011; G05D 1/0094; G08G 1/00; G08G 1/01; G08G 1/04; G08G 1/09; G08G 1/095; G08G 1/0955; G08G 5/00; G08G 5/0004; G08G 5/0013; G08G 5/0017; G08G 5/0021; G08G 5/0047; G08G 5/0069; G08G 5/0073; G08G 5/0078; G08G 5/04; G08G 5/045; H04B 7/00; H04B 7/14; H04B 7/15; H04B 7/185; H04B 7/18502
See application file for complete search history.

(56) References Cited

U.S. PATENT DOCUMENTS

2015/0353206 A1* 12/2015 Wang .................. G05D 1/0684
                                                      244/114 R
2016/0272317 A1*  9/2016 Cho ..................... G05D 1/0088
(Continued)

FOREIGN PATENT DOCUMENTS

EP           3124379 A1    2/2017

*Primary Examiner* — Charles J Han
(74) *Attorney, Agent, or Firm* — Greer, Burns & Crain, Ltd.

(57) ABSTRACT

An unmanned aircraft is described. The unmanned aircraft includes a signal output unit and a control unit. The control unit receives at least one signal to be output by the signal output unit. The control unit transmits at least a first signal to the signal output unit, so that the signal output unit outputs the first signal. The unmanned aircraft may be used stand-alone or autonomous as a movable signal output device, but it may also be coupled with a carrier vehicle to meet the function of a signal output device at the carrier vehicle.

18 Claims, 1 Drawing Sheet

(51) Int. Cl.
*G05D 1/00* (2006.01)
*B64D 47/02* (2006.01)
*G08G 1/04* (2006.01)
*B60Q 7/00* (2006.01)
*G08G 5/00* (2006.01)
*G08G 5/04* (2006.01)
*H04B 7/185* (2006.01)

(52) U.S. Cl.
CPC ............ *G05D 1/0094* (2013.01); *G08G 1/04* (2013.01); *G08G 1/0955* (2013.01); *G08G 5/0013* (2013.01); *G08G 5/0021* (2013.01); *G08G 5/0069* (2013.01); *G08G 5/0078* (2013.01); *G08G 5/045* (2013.01); *H04B 7/18504* (2013.01); *B64C 2201/027* (2013.01); *B64C 2201/122* (2013.01); *B64C 2201/126* (2013.01); *B64C 2201/141* (2013.01); *B64C 2201/146* (2013.01); *B64C 2201/208* (2013.01)

(56) References Cited

U.S. PATENT DOCUMENTS

| | | |
|---|---|---|
| 2016/0376031 A1 | 12/2016 | Michalski et al. |
| 2017/0029131 A1 | 2/2017 | Steinwandel et al. |
| 2018/0273175 A1 | 9/2018 | Klettke |

\* cited by examiner

DRONE WITH TARGET TRACKING AND SIGNAL OUTPUT

CROSS-REFERENCE TO PRIORITY APPLICATION

This application claims the benefit of, and priority to, German patent application number 202017101730.3, filed Mar. 24, 2017. The content of the referenced application is incorporated by reference herein.

TECHNICAL FIELD

The description relates to an unmanned aircraft having a signal output unit which makes it possible to display or output signals that are perceptible by persons who are in the vicinity of the unmanned aircraft. Furthermore, the description relates to a system that includes a vehicle and an unmanned aircraft.

BACKGROUND

Unmanned aircraft may be used for various purposes. For example, unmanned aircraft may have a very low weight and a small size, whereby, for example, a long hover time or flight duration can be achieved due to low energy requirements or energy needs. Unmanned aircraft may be used for purposes of reconnaissance of an area. It is also conceivable that unmanned aircraft be used to transport goods to a given destination position or target position.

For example, an unmanned aircraft may be a drone. The drone typically has a drive unit arranged and configured to drive a lift unit and a propulsion unit so that the drone follows a desired motion path or trajectory in space. The drone comprises an energy supply unit which supplies the drive unit with the required energy or energy form. For example, the energy supply unit may deliver or provide electrical energy. Of course, there are other types of energy forms and associated drive units conceivable.

Patent publications EP 3 124 379 A1 and US 2017/029131 A1 describe the basic structure of vertical take-off drones.

BRIEF SUMMARY

There may be a need for providing signals and messages even in hard-to-reach or hardly accessible terrain and over long distances and in a clearly perceptible manner.

An unmanned aircraft with a signal output unit and a control unit (processor, computerized device) is provided. The control unit is configured to receive at least one signal that is to be output by the signal output unit. The control unit is further configured to transmit at least a first signal to the signal output unit, so that the signal output unit outputs the first signal.

The unmanned aircraft may, in particular, be a drone, which may hover above the ground to hold a position in the air or may move along a predetermined or predeterminable movement path in the air. In this case, the unmanned aircraft may output signals via the signal output unit so that the signals may be perceived by persons in the vicinity or surroundings of the unmanned aircraft, i.e., persons on the ground in a certain radius around the position of the unmanned aircraft. The output signals may, in particular, be optical or acoustic signals. The optical signals may be displayed or output by simple lighting units, possibly in different colors, or as a text message. The text message may be a static representation or a dynamic representation, for example in the form of a scrolling text. The acoustical signals may be alert tones of constant or varying frequency or voice messages.

The signal to be output may be selected depending on the intended use or operation purpose of the unmanned aircraft. For example, the unmanned aircraft may be used to indicate a danger spot on the road or traffic. In this case, the unmanned aircraft may be positioned in hover flight over the danger spot or at a certain distance with respect thereto and may output an optical signal indicative of the danger, for example in the form of a flashing light. As a result, vehicles that approach the danger spot, may be warned. Also, the unmanned aircraft may be used to point out non-local obstacles, restrictions or danger spots, such as, for example, a low-speed heavy-load transport or the end of a traffic jam whose position changes with each additional vehicle. The unmanned aircraft may hover above the road at a predetermined or predeterminable altitude or height, so that it may be recognized by approaching vehicles already from a considerable distance, for example several hundred meters.

In one example, the unmanned aircraft may comprise an environment detection unit, wherein the environment detection unit is configured to detect the surroundings or environment of the unmanned aircraft and to transmit the detected environment to the control unit.

The environment detection unit may comprise a plurality of sensors or sensor units, for example a camera, a thermal imaging camera, a residual light amplifier or a night vision camera, microphones, ultrasonic sensors, etc.

The unmanned aircraft may be configured to autonomously or partially autonomously process the data acquired by the environment detection unit and to additionally or alternatively transmit it to a stationary evaluation station separated from the unmanned aircraft, so that an operator at the evaluation station may evaluate the acquired data to decide on further measures or actions.

Depending on the data acquired by the environment detection unit, the unmanned aircraft may autonomously adjust its position. Alternatively, a position change may be initiated and given by the operator in the evaluation station.

In a further example, the unmanned aircraft may comprise a coupling unit which enables coupling of the unmanned aircraft to a base or basis, so that the unmanned aircraft is coupled electrically and mechanically with the base and furthermore enables a data transfer between the base and the unmanned aircraft.

The base may be part of the evaluation station. It should be noted that the evaluation station may be a stationary building, but also a mobile unit, to which the unmanned aircraft may transmit information and from which the unmanned aircraft may receive commands.

For example, the base allows the unmanned aircraft to be powered or charged (provided with energy) prior to deployment, and also to configure the unmanned aircraft. In the context of this configuration, information may be transmitted to the unmanned aircraft, for example, the signals to be output or the specification of a target position to which the unmanned aircraft must move, wherein the movement path can also be specified here. Alternatively or additionally, information for the environment detection unit may be specified in order to be able to recognize and track a target object to be tracked.

In a further example, the unmanned aircraft may comprise at least one functional module interface which allows the coupling of further functional modules to extend a range of functions of the unmanned aircraft.

The functional module interface may allow for modular expansion of the functionality of the unmanned aircraft. For example, mission-specific functional modules may be used to prepare and appropriately configure the unmanned aircraft to the requirements of an upcoming mission.

In one example, the functional module interface is designed to receive at least one functional module from the group consisting of the following functional modules: lighting unit, irritant gas unit, infrared camera, gripper arm. In this case, the functional module interface is coupled with the control unit so that the control unit can control a function of the at least one received functional module.

For example, the control unit may receive a suitable or appropriate configuration set from the base with the configuration set containing the functional scope of the functional module and the associated instruction set (command set). Thus, the control unit may be dynamically adapted to the functional scope of the unmanned aircraft if a new functional module is added to the unmanned aircraft. Advantageously, a functional module is reversibly coupled to the unmanned aircraft so that another functional module can be coupled to the functional module interface as desired.

In another example, the unmanned aircraft comprises a control signal receiver which is configured to receive a wirelessly transmitted control signal and to transmit the control signal to the control unit so that a movement path of the unmanned aircraft can be changed.

Thus, the control signal can be used for motion control. However, the control signal may also be used to change the function of other components of the unmanned aircraft, for example in order to change the signal output by the signal output unit, or also to control a functional module which is coupled to the functional module interface. In other words, the control signal may be used to remotely control the unmanned aircraft and all components contained therein.

In another example, the control unit is configured to receive a signal that is to be output by the signal output unit and to, immediately after receiving, forward this received signal to the signal output unit.

This example is particularly suitable for transmitting signals from the base or the evaluation station to the unmanned aircraft and to directly output the signals by the signal output unit.

In another example, the control unit comprises a memory module and is configured to store a received signal that is to be output by the signal output unit for a later or repeated replay of this signal in the memory module.

As already described above, signals to be output may be stored in the memory module during a configuration time, but these signals may also be transmitted to the unmanned aircraft during the operating time of the unmanned aircraft, i.e., during the flight, and may be stored in the memory module.

In another example, the signal output unit comprises an optical display element configured to output or display optical signals or notifications.

In another example, the signal output unit comprises an acoustic output element configured to output acoustical signals or notifications.

The acoustic output element may be a loudspeaker or other signal generator.

In another example, the unmanned aircraft furthermore comprises a position determination unit, wherein the position determination unit is configured to determine or detect a position of the unmanned aircraft and to transmit the determined position to the control unit.

The position determination unit may be configured to determine the position of the unmanned aircraft in a global coordinate system of the earth, which may also be referred to as absolute position. Alternatively or additionally, the position determination unit may be configured to determine a position of the unmanned aircraft with respect to the base or evaluation station, which may also be referred to as the relative position.

In an example, the position determination unit is adapted to determine the position of the unmanned aircraft based on satellite signals or based on terrestrial position signals.

For example, the position determination unit may use signals from satellites from the so-called global positioning system (GPS) or other satellite systems such as Galileo.

In another example, the control unit is configured to select the at least one signal to be output by the signal output unit as a function of (depending on) the position determined by the position determination unit and to transmit the signal to the signal output unit.

This allows a signal to be output only when the unmanned aircraft has reached a certain position.

In another example, the control unit is configured to select a target object from the detected environment and to change a movement path of the unmanned aircraft in such a way that the unmanned aircraft follows the target object as the target object changes its position.

Thus, the unmanned aircraft allows a so-called target tracking and may autonomously or partially autonomously adapt its position to changed conditions without intervention by a human operator.

According to another aspect, a system is provided, wherein the system comprises at least a vehicle, in particular a land vehicle, and an unmanned aircraft as described above and hereinafter. In this example, an interface is attached to the vehicle, which allows the unmanned aircraft to couple with this interface mechanically and electrically and to establish a data connection.

In the terminology chosen above, the vehicle represents the base or the evaluation station. In this case, an operator may be in the vehicle who monitors and/or controls the operation of the unmanned aircraft. The system may be configured so that the operator can at any time terminate an autonomous or semi-autonomous operating mode of the unmanned aircraft and take over the control.

The unmanned aircraft as described herein may be used for various purposes and offers multiple benefits. For example, it may be used to accompany a heavy load transport, wherein the vehicle to be accompanied may have an at least partially existing base, with which the unmanned aircraft may couple as needed or during breaks in the trip or journey to recharge the energy storage. Furthermore, the unmanned aircraft may be used to track people and track their movement, for example, during police and rescue missions on land and sea. The unmanned aircraft may, for example, carry a life jacket and discard, if necessary. The unmanned aircraft described herein allows great flexibility in assembling or composing the functions so that it can be prepared and used for various operation scenarios.

The unmanned aircraft may be coupled to the base between two operations. If the base is a land vehicle, the unmanned aircraft may be carried by the land vehicle to the next operation site or close to the next operation site. While the unmanned aircraft is coupled to the base, the required configuration data may be transmitted and/or the energy store may be loaded or charged.

Also, the unmanned aircraft, while coupled with the land vehicle, may be used as the signal output unit of the land vehicle. For this purpose, the signal output unit of the unmanned aircraft can be controlled directly from the land vehicle to act as a warning light, indicator light, speaker, etc. In other words, the unmanned aircraft is designed for dual use. It may be used in a first mode of operation as an unmanned aircraft detached from the land vehicle, such as described above, for example. In a second mode of operation, the unmanned aircraft is coupled to the land vehicle and used as a signal output unit of the land vehicle.

In the second mode of operation, the unmanned aircraft is mechanically and electrically coupled to the land vehicle and also has a communication connection or data exchange connection to the land vehicle. Control signals are transmitted to the signal output unit or to the control unit via the communication connection or data exchange connection to start a desired function or to output a desired signal. If the unmanned aircraft is in the second operating mode, its drive unit is not needed.

Also, in the second operating mode, the unmanned aircraft may be referred to as a pure signaling device of the land vehicle and fulfill a corresponding function. When referring to a signaling device in the following, this refers to the unmanned aircraft described above and below. The signaling device may be part of an emergency vehicle, such as a police vehicle or a fire engine. The emergency vehicle may use the signaling device for outputting optical or acoustic signals. If the signaling device is required for use independently of the land vehicle, the connection between the two is resolved, and the signaling device may be used as an unmanned aircraft autonomously or partially autonomously in flight operation.

The unmanned aircraft may be equipped with various functions. Some of them are described here by way of example. A warning light in different colors and with different light patterns may be provided. Likewise, a lighting unit may be provided which can light up or illuminate an area from the air. A signal horn can emit warning sounds that are audible even at a distance. A gripper arm may hold and release objects over a target position or, conversely, grasp an object and bring it to the base or to a desired location.

The unmanned aircraft may be provided with one or more hooks. At this hook, a payload, for example, a privacy screen or an infusion bottle, may be attached while the aircraft hovers over the operation site.

In this case, the functional module interface is configured such that different functional modules can be coupled to the unmanned aircraft via this uniform or standardized interface.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

In the following, exemplary embodiments are described with reference to the drawings. It is shown in.

DETAILED DESCRIPTION

Figure 1:
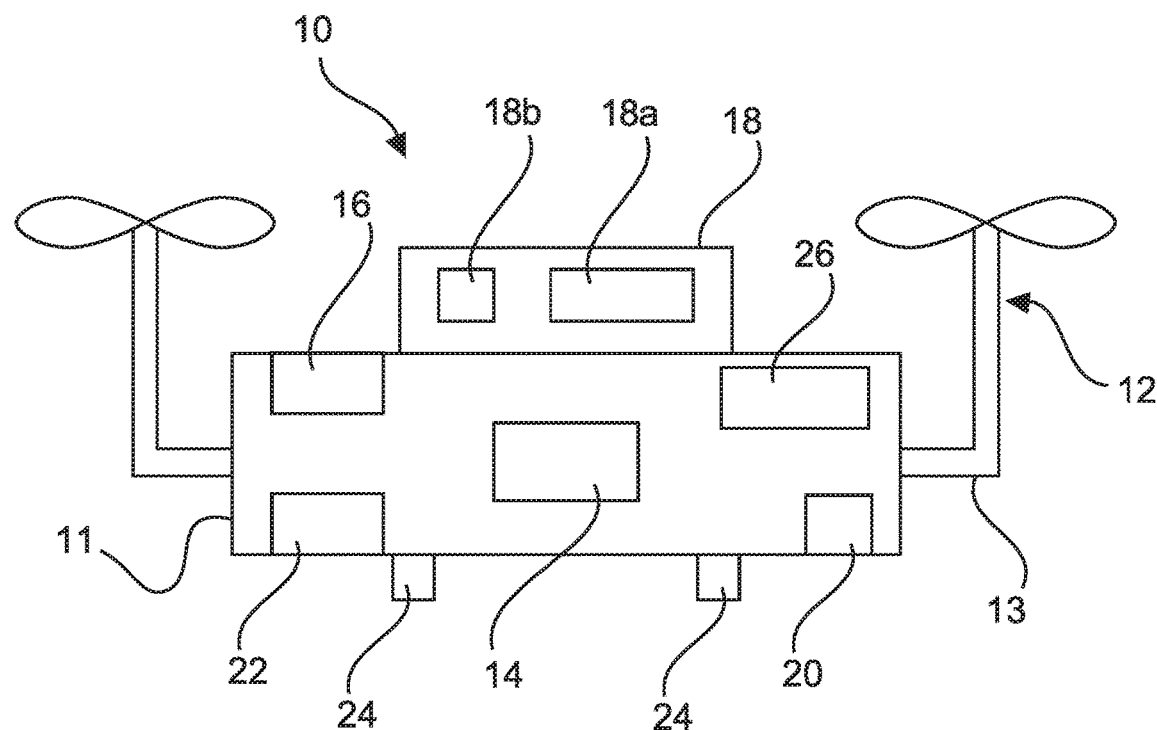
FIG. 1, which depicts an unmanned aircraft or a signaling device according to an exemplary embodiment.

The representations and illustrations in the drawings are schematic and not to scale. If similar reference signs are used in the following description of the drawings, these indicate equal or similar elements.

FIG. 1 shows an unmanned aircraft 10 in a first mode of operation, that is independently movable from a land vehicle or from a base.

Initially, the unmanned aircraft 10 comprises a lift unit 12, which can be driven by a drive unit that is not shown. The lift unit 12 may include one or more propellers to move the unmanned aircraft 10 in the air space or to keep it in hovering or hover flight. The drive unit may be a motor, for example an electric motor. However, there are also other drive units possible which can provide the lift unit 12 with motion energy.

The propellers of the lift unit 12 are coupled to a housing 11 of the unmanned aircraft 10 via a holding arm 13 or supporting arm. When the unmanned aircraft 10 is operated in the second mode of operation, i.e., when it is coupled to a vehicle, each support arm with each propeller may be folded or retracted into the housing 11 or may be removed from the unmanned aircraft 10. Then, the unmanned aircraft 10 may be used as a component of the vehicle, and the lift unit 12 is not affected by movement or drive of the vehicle to which the unmanned aircraft 10 is coupled.

The unmanned aircraft 10 further comprises a control unit 14, which is configured to control and adapt the functions of the unmanned aircraft 10. The control unit 14 may control both the functional modules and the functional units and the lift unit 12 and, thereby, predefine a movement path of the unmanned aircraft 10.

The unmanned aircraft 10 furthermore comprises a position determination unit 16. The position determination unit 16 is configured to determine a current position of the unmanned aircraft 10. In this case, the position determination unit 16 may utilize signals of a satellite-based as well as a terrestrial position determination system. Furthermore, the position determination unit 16 may be configured to determine a relative position with respect to a predetermined reference point. The reference point may be part of the base or evaluation station.

The unmanned aircraft 10 furthermore comprises a signal output unit 18, wherein the signal output unit 18 comprises an optical or visual display element 18a and an acoustic output element 18b. The optical display element may be, for example, a flashing light or a text display unit. The acoustic output element may be a loudspeaker or a signal horn.

The unmanned aircraft 10 furthermore comprises a control signal receiver 20. The control signal receiver 20 may be configured to receive control signals related to the motion path or path of travel of the unmanned aircraft 10 and/or related to one or more of the functional modules. The control signal receiver 20 may receive control signals when the unmanned aircraft 10 is in flight or when the unmanned aircraft 10 is coupled to a land vehicle (may also be referred to as a host vehicle or carrier vehicle). Thus, it is possible to output signals in both states of the unmanned aircraft 10 via the signal output unit 18. This enables a dual function or dual use of the unmanned aircraft 10, on the one hand as an autonomous and individually movable unit for displaying and outputting optical and acoustic signals and on the other hand as a functional unit of a host vehicle.

The unmanned aircraft 10 furthermore comprises an environment detection unit 22. The environment detection unit 22 may comprise a plurality of identical or different elements that can detect and/or search the environment of the unmanned aircraft. By way of example, the environment detection unit may comprise a camera, a thermal imaging camera, a residual light amplifier, an ultrasound sensor and other sensors or detectors which can detect a parameter from the surroundings of the unmanned aircraft. The environment detection unit 22 may transmit the detected parameters of the environment to the control unit 14 for local evaluation and/or to the base or evaluation station for evaluation there. For transmitting these data to the base or evaluation station, a transmission channel of the control signal receiver 20 or a separate transmission channel that is established by the environment detection unit 22 to the base or evaluation station, may be used.

The unmanned aircraft 10 furthermore comprises a coupling unit 24, via which it can be coupled to a host vehicle. The coupling unit 24 may establish a mechanical connection or fixation, an electrical connection and a communication connection between the unmanned aircraft 10 and the host vehicle. The mechanical connection serves the purpose that the unmanned aircraft is reversibly connected to the host vehicle, so that the unmanned aircraft remains in the desired position during a journey or travel of the host vehicle. Via the electrical connection, the unmanned aircraft is supplied with electrical energy in the second operating mode (when it is coupled to the host vehicle). In this case, the local energy store of the unmanned aircraft 10 may be charged and the other functional modules may be operated. The communication link between the unmanned aircraft 10 and the host vehicle may be used to transmit information to the control unit 14 or directly to the signal output unit 18.

Last, the unmanned aircraft 10 comprises a functional module interface 26, which makes it possible to accommodate or receive further functional modules. The functional module interface 26 in particular provides a uniform interface for expanding or upgrading functional modules. Depending on the intended use, the range of functions of the unmanned aircraft 10 may be adapted or changed. For this purpose, it may be necessary to accordingly configure the control unit 14 before connecting a functional module or to provide the control unit 14 by nature with all available configuration sets or instruction sets for all functional modules.

Figure 2:
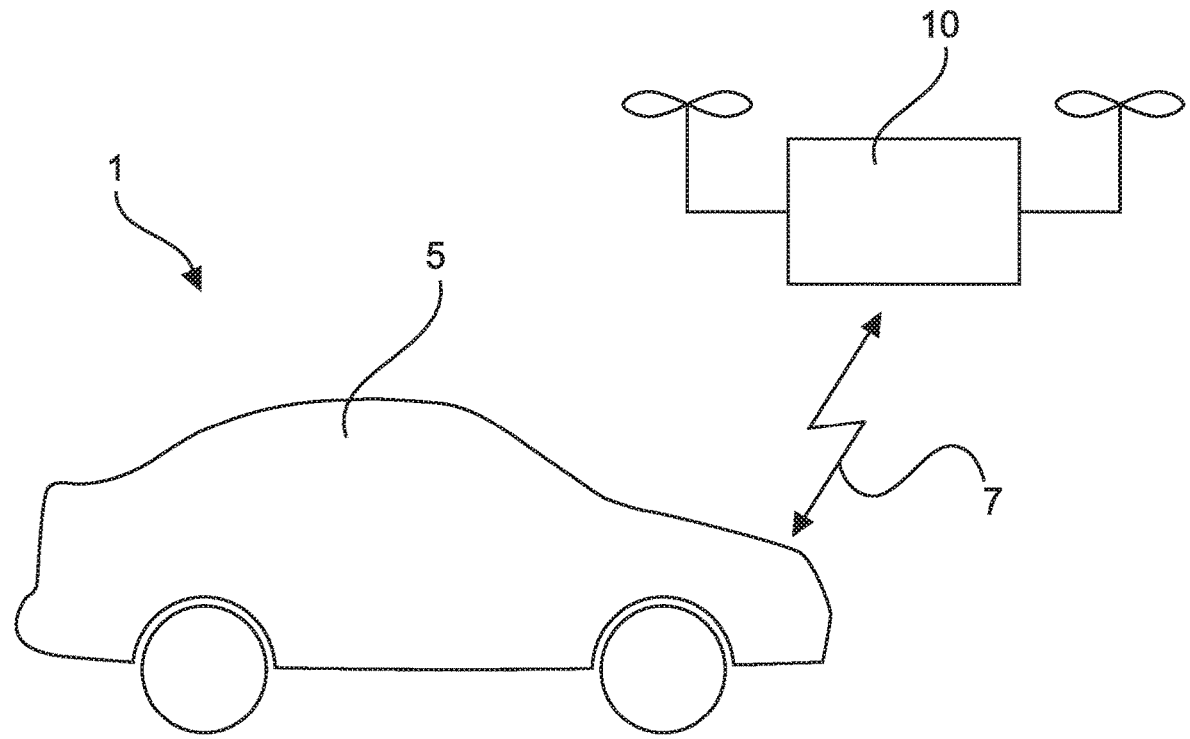
FIG. 2, which depicts a system including a land vehicle and an unmanned aircraft or a signaling device according to another exemplary embodiment.

FIG. 2 shows a system 1 that includes a vehicle 5 and an unmanned aircraft 10. The vehicle 5 may be referred to as a carrier vehicle, host vehicle, base, or evaluation station. The unmanned aircraft 10 maintains a communication link 7 to the vehicle 5. Via the communication link 7, control signals may be transmitted to the unmanned aircraft 10 and data may be transmitted from the unmanned aircraft 10 to the vehicle 5. The communication link 7 may comprise one or more transmission channels and may allow bidirectional data transfer.

In the exemplary embodiment shown in FIG. 2, the unmanned aircraft 10 is in the first mode of operation (the unmanned aircraft 10 is in flight or hover flight and moves detached from the vehicle 5). The data transmitted from the unmanned aircraft 10 to the vehicle 5 may be displayed on a suitable operator station (not shown) in the vehicle 5 and/or may be evaluated by evaluation units.

The unmanned aircraft 10 may at any time return to the vehicle 5 and may be coupled via the coupling unit 24 (see FIG. 1) to a corresponding counterpart, e.g. on the roof of the vehicle 5, in order then to be used as part of the vehicle 5 in the first operating mode, so that signals can be output via the signal output unit 18, for example while the vehicle 5 is travelling.

Additionally, it is noted that "comprising" or "including" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

| List of Reference Numbers | |
|---|---|
| 1 | system |
| 5 | carrier vehicle |
| 7 | communication link |
| 10 | unmanned aircraft |
| 11 | housing |
| 12 | lift unit |
| 13 | holding arm |
| 14 | control unit |
| 16 | position determination unit |
| 18 | signal output unit |
| 18a | optical display element |
| 18b | acoustic output element |
| 20 | control signal receiver |
| 22 | environment detection unit |
| 24 | coupling unit |
| 26 | functional module interface |

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An unmanned aircraft that is configured to be coupled with a vehicle, comprising:

a signal output unit;

a controller comprising a processor and a memory module;

wherein the controller is configured to receive at least one signal that is to be output by the signal output unit;

wherein the controller is configured to transmit a first signal, of the at least one signal, to the signal output unit, and wherein the signal output unit is configured to output the first signal; and a coupling unit which enables coupling of the unmanned aircraft to a base of the vehicle, the coupling unit configured to couple the unmanned aircraft to the base electrically and mechanically, and wherein the coupling unit is configured to enable data transfer between the base and the unmanned aircraft;

wherein while the unmanned aircraft is coupled to the base of the vehicle, the signal output unit is configured to be controlled directly from the vehicle;

wherein while the unmanned aircraft is coupled to the base of the vehicle, the signal output unit is configured to act as a signaling device of the vehicle;

wherein while the unmanned aircraft is coupled to the base of the vehicle, the signaling device is configured for outputting optical or acoustic signals.

2. The unmanned aircraft of claim 1, further comprising:
an environment detection unit;
wherein the environment detection unit is configured to detect an environment of the unmanned aircraft and to transmit the detected environment to the controller.

3. The unmanned aircraft of claim 2,
wherein the controller is configured to select a target object from the detected environment and to change a movement path of the unmanned aircraft in such a way that the unmanned aircraft follows the target object as the target object changes its position.

4. The unmanned aircraft of claim 1, further comprising:
at least one functional module interface which allows the coupling of further functional modules to extend a range of functions of the unmanned aircraft.

5. The unmanned aircraft of claim 4,
wherein the functional module interface is configured to receive at least one functional module from the group consisting of the following functional modules: lighting unit, irritant gas unit, infrared camera, gripper arm;
wherein the functional module interface is coupled with the controller and wherein the controller is configured to control a function of the at least one received functional module.

6. The unmanned aircraft of claim 1, further comprising:
a control signal receiver which is configured to receive a wirelessly transmitted control signal and to transmit the control signal to the controller and wherein the controller is configured to change a movement path of the unmanned aircraft.

7. The unmanned aircraft of claim 1,
wherein the controller is configured to receive a signal that is to be output by the signal output unit and to, immediately after receiving, forward this received signal to the signal output unit.

8. The unmanned aircraft of claim 1,
wherein the memory module is configured to store a received signal that is to be output by the signal output unit for a later or repeated replay of this signal in the memory module.

9. The unmanned aircraft of claim 1,
wherein the signal output unit comprises an optical display element that is configured to output or display optical signals or notifications.

10. The unmanned aircraft of claim 1,
wherein the signal output unit comprises an acoustic output element that is configured to output acoustic signals or notifications.

11. The unmanned aircraft of claim 1, further comprising:
a position determination unit;
wherein the position determination unit is configured to determine or detect a position of the unmanned aircraft and to transmit the determined position to the controller.

12. The unmanned aircraft of claim 11,
wherein the position determination unit is configured to determine the position of the unmanned aircraft based on satellite signals or based on terrestrial position signals.

13. The unmanned aircraft of claim 11,
wherein the controller is configured to select the at least one signal to be output by the signal output unit depending on the position determined by the position determination unit and to transmit the signal to the signal output unit.

14. A system, comprising:
a vehicle, in particular a land vehicle; and
an unmanned aircraft, comprising:
a signal output unit;
a controller comprising a processor and a memory module;
wherein the controller is configured to receive at least one signal that is to be output by the signal output unit;
wherein the controller is configured to transmit a first signal, of the at least one signal, to the signal output unit, and wherein the signal output unit is configured to output the first signal; and
a coupling unit which enables coupling of the unmanned aircraft to a base of the vehicle, so that the unmanned aircraft is coupled electrically and mechanically with the base and furthermore enables a data transfer between the base and the unmanned aircraft;
wherein while the unmanned aircraft is coupled to the base of the vehicle, the signal output unit is configured to be controlled directly from the vehicle;
wherein while the unmanned aircraft is coupled to the base of the vehicle, the signal output unit is configured to act as a signaling device of the vehicle;
wherein while the unmanned aircraft is coupled to the base of the vehicle, the signaling device is configured for outputting optical or acoustic signals.

15. The system of claim 14, wherein the unmanned aircraft further comprises:
an environment detection unit;
wherein the environment detection unit is configured to detect an environment of the unmanned aircraft and to transmit the detected environment to the controller.

16. The system of claim 14, wherein the unmanned aircraft further comprises:
at least one functional module interface which allows the coupling of further functional modules to extend a range of functions of the unmanned aircraft.

17. The system of claim 16,
wherein the functional module interface is configured to receive at least one functional module from the group consisting of the following functional modules: lighting unit, irritant gas unit, infrared camera, gripper arm;
wherein the functional module interface is coupled with the controller and wherein the controller is configured to control a function of the at least one received functional module.

18. The system of claim 14, wherein the unmanned aircraft further comprises:
a control signal receiver configured to receive a wirelessly transmitted control signal and to transmit the control signal to the controller and wherein the controller is configured to change a movement path of the unmanned aircraft.

* * * * *